Sept. 21, 1965  F. W. LOCKE ETAL  3,207,414
FROZEN POULTRY CONTAINERS

Filed Aug. 19, 1963  2 Sheets-Sheet 1

INVENTOR
FRANK W. LOCKE
WALTER H. RASMUSSEN
HENRY R. RUSSELL
BY Robert M. Dunning ATTORNEY Sept. 21, 1965 F. W. LOCKE ETAL 3,207,414
FROZEN POULTRY CONTAINERS
Filed Aug. 19, 1963 2 Sheets-Sheet 2

INVENTOR
FRANK W. LOCKE
WALTER H. RASMUSSEN
HENRY R. RUSSELL
BY Robert M. Dunning
ATTORNEY

3,207,414
FROZEN POULTRY CONTAINERS

Frank W. Locke, Minneapolis, and Walter H. Rasmussen and Henry R. Russell, St. Paul, Minn., assignors to Waldorf Paper Products Company, St. Paul, Minn., a corporation of Minnesota
Filed Aug. 19, 1963, Ser. No. 302,891
6 Claims. (Cl. 229—36)

This invention relates to an improvement in frozen poultry containers and deals particularly with a container in which poultry may be placed prior to freezing and which permits the circulation of refrigerated air through the container during this process.

Turkeys and other poultry are often sold in a frozen condition. A number of birds are placed in a container before they are frozen as they fit better in the container when in a somewhat pliable form, and in order to prevent handling of the frozen birds. As the shipping containers are usually made of corrugated paperboard, which acts as an insulating medium, and as it is desirable to quick freeze the birds, some means is usually provided for permitting the circulation of air through the containers while they are being frozen and stored. As the containers are stacked one upon the other, the containers must possess considerable stacking strength. Furthermore, it is necessary to produce the containers so that they can be set up from a flat form to erected form in a short period of time, and it is also essential that the containers be closed in a simple and effective manner when the birds are to be shipped. It is an object of the present invention to provide a container of that type.

A feature of the present invention lies in the provision of a container having notches in certain of the opposed walls, such as the end walls of the container, and to provide a pair of closure panels hinged to the side walls and adapted to meet at the center of the container. These cover panels are provided with end flaps adapted to fold down and close the notches in the end walls for shipping purposes. Each of these cover panels, with the end flaps connected thereto, are divided into two equal sections by score lines parallel to the free ends of the cover panels and extending across the cover panels and end flaps. These end flaps are substantially equal in depth to the end walls. By folding the end portions of the cover panels and end flaps along these fold lines, the end portions of the cover panels will lie in superposed relation to the inner portions of the cover panels which are hinged to the side walls. The double thickness end flaps are tucked down inwardly of the end walls of the container and form, with the doubled cover panels, an extremely strong U-shaped bridge capable of sustaining considerable weight.

A feature of the present invention lies in the provision of a locking means which may be used to hold the doubled cover panels in face contact. This locking means comprises a pair of similar locking tabs cut in both sections of each cover panel and arranged so that one tab can be forced through the opening formed by the other tab when flexed out of the plane of the cover. When the container is closed, these tabs may flex back into the plane of the remainder of the cover panels to close the openings.

A feature of the present invention resides in the provision of a flange hingedly connected to one of the walls near each corner of the container which may be folded to extend diagonally across the container corners to form a triangular post structure. Each such flange is provided with a projecting tongue or ear which automatically holds the flange extending diagonally across the container corner.

These and other objects and novel features of the present invention will be more clearly and fully set forth in the following specification and claims.

In the drawings forming a part of the spectification;

Figure 1:
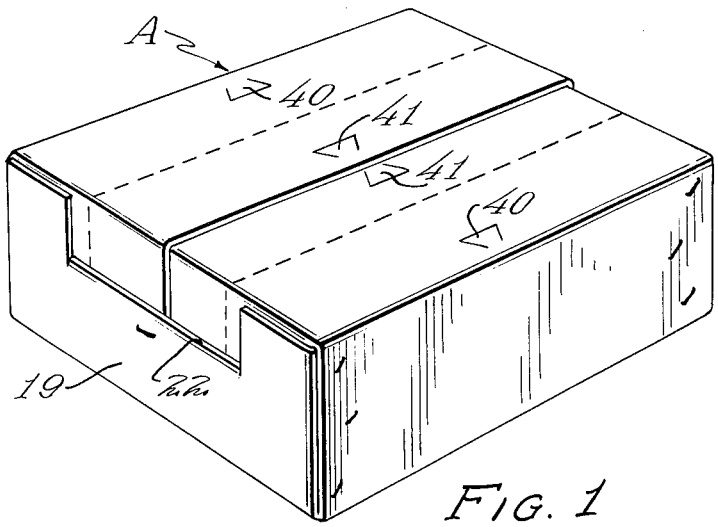
FIGURE 1 is a perspective view of the container in closed position in readiness for shipment.

The container A includes a rectangular bottom panel 10 hingedly connected upon parallel fold lines 11 to side wall panels 12. The side wall panels 12 are hingedly connected along parallel fold lines 13 to a top structure illustrated in general by the numerals 14. The top structures 14 each include an inner panel portion 15 and an outer panel portion 16 connected along a fold line 17 which is parallel to the previously described fold lines. The panel portions 15 and 16 are preferably of substantially equal area.

The bottom panel 10 is hingedly connected to end wall panels 19 along parallel fold lines 20 which intersect the fold lines 11 at right angles. A notch of relatively large size is formed in the end edge 21 of each end panel 19 the edges 21 forming the upper edges of the end walls in the erected condition of the container. The notches 22 are formed by a pair of cut lines 23 extending inwardly from the end edges 21 at substantially right angles thereto. The ends of the cut lines 23 are connected by a fold line 24.

In forming the notch 22, the rectangular flap 25 which is between the cut lines 23 and outwardly of the fold line 24 is folded into face contact with the adjoining portion of the end wall panel 19 and is stitched or otherwise secured thereto.

Corner flaps 26 are hingedly connected to the ends of the end wall panels 19 along parallel fold lines 27, which are substantially aligned with the fold lines 11. Post forming flaps 29 are hingedly connected to the corner flaps 26 along parallel fold lines 30. The fold lines 30 are interrupted intermediate their ends by generally U-shaped cut lines 31 which form short projecting tabs or tongues 32 which extend into the corner flaps 26 beyond the fold lines 30. Terminal flaps 33 may be connected to the post forming flaps 29 along parallel fold lines 34. The purpose of this arrangement will be later described.

Cover end flaps 35 and 36 are foldably connected to the ends of the cover panels 15 and 16 along fold lines 37 which are generally aligned with the fold lines 20. The end flaps 35 and 36 are hingedly connected together by fold lines 39 which are extensions of the fold lines 17. The container illustrated in its set up condition in FIGURES 1 and 2 is formed of the blank thus described.

Figure 6:
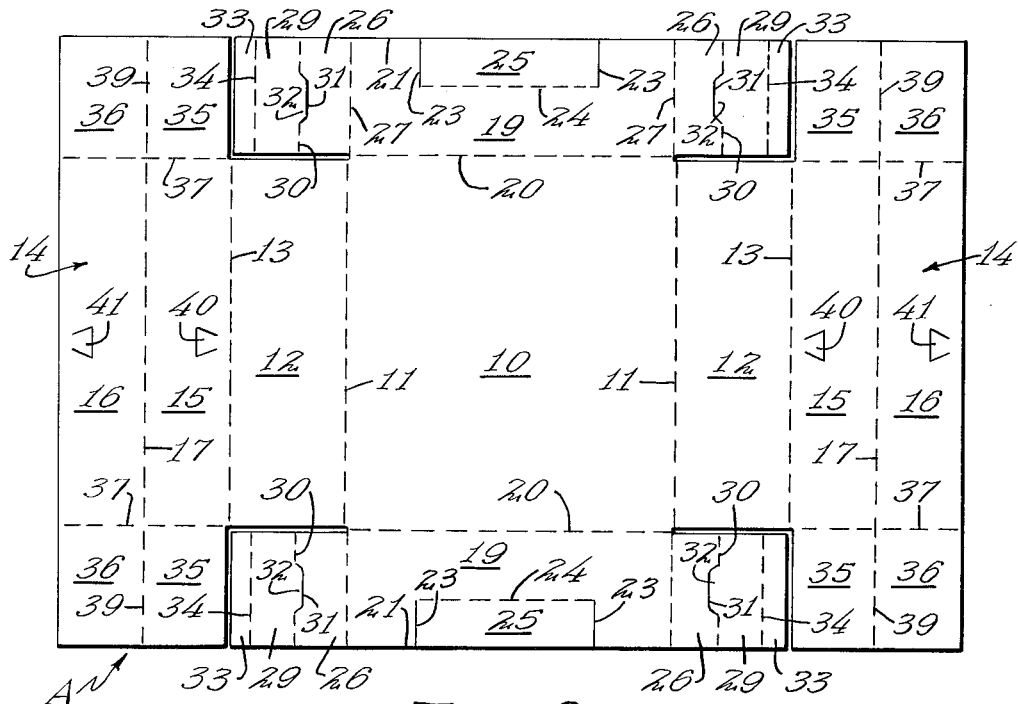
FIGURE 6 is a diagrammatic view of the blank from which the container is formed.

In setting up the container A from the blank form shown in FIGURE 6, the side and end walls 12 and 19 are folded upwardly into right angular relation to the bottom 10, and the corner flaps 26 are stitched or otherwise secured in face contact with the side wall panels 12. The flaps 25 which form the notches 22 are folded inwardly and secured in face contact with end walls 19. This completes the assembly of the container. However, before the container is closed, the post forming flaps 29 are folded to extend diagonally of the container corners in the manner illustrated in FIGURE 5. In this operation, the tongues or ears 32 are swung against the end walls 12, acting to flex the adjoining portion of the corner flaps 26 away from the end wall 12. As the flaps 29 are swung past right angular relation with the end walls 12, the ends of the tabs 32 engage the inner surfaces of the side walls 12 to hold the flaps 29 in diagonal position. The terminal flaps 33 may lie along the inner surface of the end walls 19, but are not secured thereto.

Figure 2:
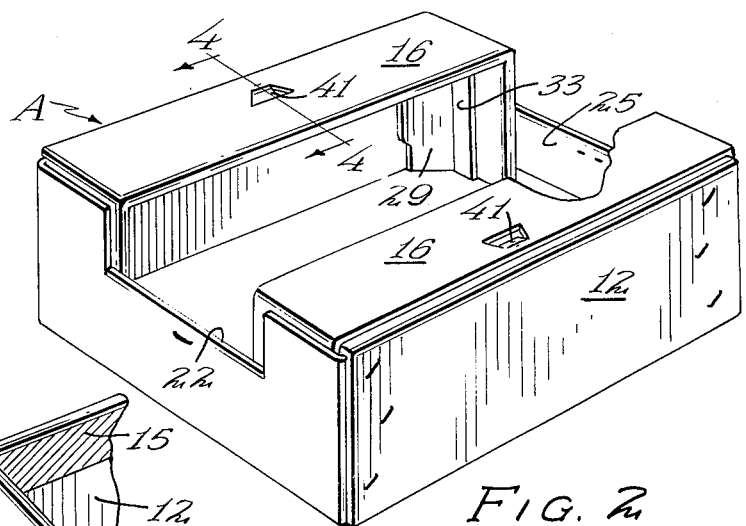
FIGURE 2 is a perspective view of the container as it appears during the freezing process.
Figures 4, 5:
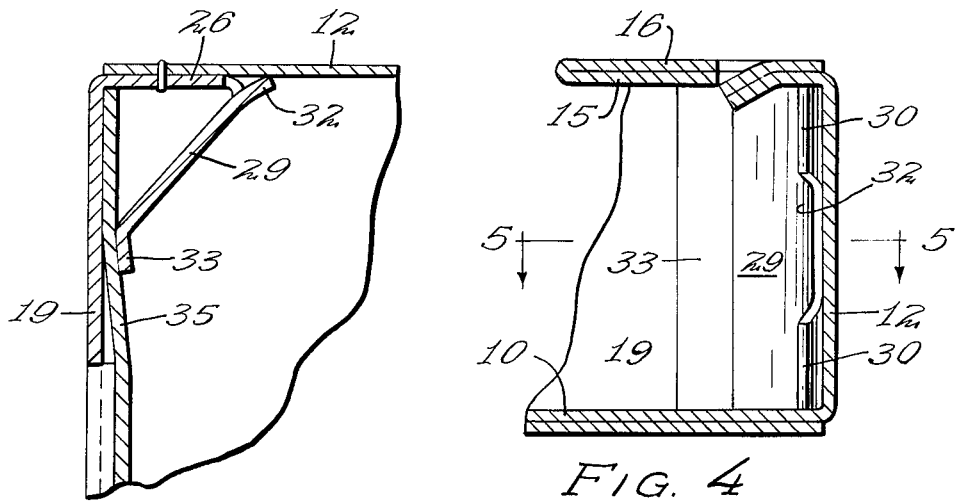
FIGURE 4 is a vertical sectional view through one of the side walls, the section being indicated by a vertical plane through the line 4—4 of FIGURE 2.
FIGURE 5 is a horizontal sectional view, the position of the section being indicated by the line 5—5 of FIGURE 4.

After the container A has been filled with the product to be frozen, the cover is folded into the position shown in FIGURE 2 of the drawing. This is done by folding the end cover panel portion 16 into face contact with the inner cover panel portions 15 and simultaneously folding the cover end flaps 35 and 36 into face contact. If desired, the cover panel portions 15 and 16 are locked in face contact by pressing downwardly on the upper of a pair of trapezoidal locking tongues 40 and 41 near the centers of the panel portions 15, 16. This operation forces the locking tongue 41 of each panel portion 16 through the opening provided by flexing the similar tab 40 and the panel portions 15. As illustrated in FIGURE 4, these tabs 40 and 41 are in superposed relation when the cover panel portions are folded together.

Figure 3:
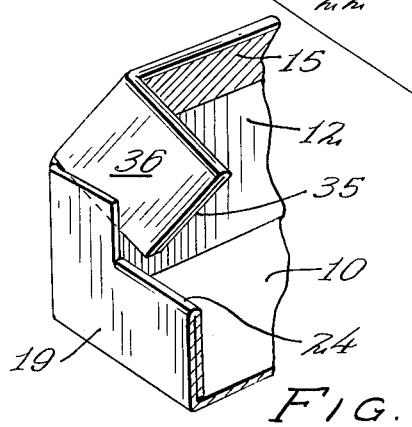
FIGURE 3 is a perspective view of a corner of the container showing the manner in which the cover panel and cover end flaps may be swung down into the position shown in FIGURE 2.

The combined cover end flaps 35, 36 are then folded into right angular relation to the cover panel portions to which they are hinged, and the combined flaps 35, 36 are then folded downwardly inwardly of the end walls 19 as best indicated in FIGURE 3 of the drawings. A double thickness inverted channel-shaped support is provided on each side of the container and on opposite sides of said notches. The container and its contents is then placed in a freezing room and the refrigerated air is blown through the containers through the notches 22 to quick freeze the product.

When the case is to be shipped, the cover panels are merely swung upwardly to extend upwardly from the edges of the side walls, the end flaps 35, 36 at each end of the cover structure are folded into alignment with the cover panel portions to which they are hinged, and the cover panel is then unfolded into flat form. The cover may then be folded into the closed position illustrated in FIGURE 1 of the drawings by again folding the end flaps 35, 36, which are now in a common plane, into right angular relation to the cover and tucking these end flaps into the container inwardly of the end walls 19. When the cover panel portions are to be unfolded, the locking tabs 40 and 41 are merely pushed back into the plane of the panels in which they are formed, the edges of the locking tongues frictionally engaging the remainder of these panels to close the openings. While the two cover panel structures may meet at the center of the case, they preferably slightly overflap to form a more effective closure.

In accordance with the patents statutes we have described the principles of construction and operation of the invention; and while an endeavor has been made to set forth the best embodiment of the invention, it should be understood that obvious changes may be made within the scope of the following claims without departing from the spirit of the invention.

We claim:

1. A container including a rectangular bottom panel, side wall panels hinged to two opposed edges of said bottom panel and extending upwardly therefrom, end wall panels hinged to the remaining two edges of said bottom panel and extending upwardly therefrom, corner flaps hinged to the end edges of two opposed wall panels and secured in face contact with the other opposed wall panels, cover panels hinged to the upper edges of said side wall panels, cover end flaps hinged to the ends of said cover panels, said cover end flaps being of a length substantially equal to the height of said wall panels, fold lines extending across said cover panels and cover end flaps parallel to, and between, the hinge lines connecting said cover panels to said side walls and the free ends of said cover panels, and notches in the upper edges of said end walls forming openings of substantial size intermediate the ends of said end walls, said cover panels and cover end flaps being folded along said fold lines with the portions of each cover panel on opposite sides of the fold line in face contact, said folded cover end flaps extending to right angular relation to the cover panels to which they are hinged and extending inwardly of said end walls, providing a double thickness inverted channel shaped support on each side of the container and on opposite sides of said notches.

2. The structure of claim 1 and including locking means in said cover panels for holding said cover panels in folded position.

3. The structure of claim 1 and in which each cover panel includes a pair of locking tongues which are in superposed relation when said cover panels are folded along said fold lines, one of which may be forced through the opening formed by the other.

4. The structure of claim 1 and including post forming flaps hinged to said corner flaps and folded diagonally across the corners of the container, the post forming flaps including tongues extending beyond the lines of fold connecting said post forming flaps to said corner flaps and in engagement with the walls to which said corner flaps are secured to hold the post forming flaps in diagonal position.

5. A corner post container including a rectangular bottom panel, side and end wall panels hinged to said bottom panel and extending upwardly therefrom, corner flaps hinged to two opposed of said walls and secured in face contact with the remaining two walls to secure the container corners together, post forming flaps hinged to the ends of said corner flaps and folded diagonally across the container corners, and tongues on said post forming flaps extending beyond the lines of fold connecting said post forming flaps to said corner flaps and in engagement with the wall panels to which said corner flaps are secured to hold said post forming flaps in diagonal position.

6. The structure of claim 5 and including terminal flaps hinged to the ends of said post forming flaps.

References Cited by the Examiner

UNITED STATES PATENTS

| | | | |
|---|---|---|---|
| 454,636 | 6/91 | Brown et al. | 229—19 |
| 1,906,964 | 5/33 | Hill. | |
| 2,513,902 | 7/50 | Tyrseck | 229—38 |
| 2,843,307 | 7/58 | Goltz | 229—36 |
| 2,986,320 | 5/61 | Nicholls et al. | 229—6 |
| 3,079,058 | 2/63 | Russell | 229—6 |

FRANKLIN T. GARRETT, *Primary Examiner.*